April 7, 1925.

J. G. JONES ET AL

1,532,753

AUTOMATIC FILM SPOOLING MACHINE

Filed May 31, 1923    5 Sheets-Sheet 1

INVENTORS,
John G. Jones & Haywood G. Dewey,
BY
ATTORNEYS.

April 7, 1925.

J. G. JONES ET AL

1,532,753

AUTOMATIC FILM SPOOLING MACHINE

Filed May 31, 1923   5 Sheets-Sheet 3

INVENTORS;
John G. Jones & Haywood G. Dewey,
BY
ATTORNEYS.

April 7, 1925.

J. G. JONES ET AL 1,532,753

AUTOMATIC FILM SPOOLING MACHINE

Filed May 31, 1923     5 Sheets-Sheet 5

FIG_19_

| | Drum 5 | Chopper 26 | Belt 8 | Pasters 7&10 | Belt 11 | Threader 61 | Spool Clutch 104 | Belt 40 | Arm 212 | Folder 299 | Frame 82 |
|---|---|---|---|---|---|---|---|---|---|---|---|
| I | | | | | | | | | | | |
| II | | | | | | | | | | | |
| III | | | | | | | | | | | |
| IV | | | | | | | | | | | |
| V | | | | | | | | | | | |
| VI | | | | | | | | | | | |
| VII | | | | | | | | | | | |
| VIII | | | | | | | | | | | |
| IX | | | | | | | | | | | |
| X | | | | | | | | | | | |
| XI | | | | | | | | | | | |
| XII | | | | | | | | | | | |

INVENTORS,
John G. Jones & Haywood G. Dewey,
BY R. L. Stinchfield
N. M. Perkins
ATTORNEYS.

Patented Apr. 7, 1925.

1,532,753

UNITED STATES PATENT OFFICE.

JOHN G. JONES AND HAYWOOD G. DEWEY, OF ROCHESTER, NEW YORK, ASSIGNORS TO EASTMAN KODAK COMPANY, OF ROCHESTER, NEW YORK, A CORPORATION OF NEW YORK.

AUTOMATIC FILM-SPOOLING MACHINE.

Application filed May 31, 1923. Serial No. 642,398.

*To all whom it may concern:*

Be it known that we, JOHN G. JONES and HAYWOOD G. DEWEY, citizens of the United States of America, residing at Rochester, in the county of Monroe and State of New York, have invented certain new and useful Improvements in Automatic Film-Spooling Machines, of which the following is a full, clear, and exact specification.

This invention relates to a process for assembling photographic roll film cartridges and to a machine in which such process may be automatically carried out.

Such cartridges include interwound strips of film and protective paper with, sometimes, carbon paper used in the making of light printed legends in the camera. Such cartridges have been assembled on various machines, among them that described in application Serial No. 516,229, filed November 18th, 1921, by John G. Jones, one of the present inventors. In all such machines, even the one above mentioned, several operations are necessarily performed by hand by an operator in a very dim illumination, and it is necessary to stop winding to perform these operations. Among the objects of this invention are to provide a process including a series of steps, which, while capable of being carried out on various types of apparatus or by hand, lend themselves particularly well to performance by an automatic machine, and to provide a machine which will be entirely automatic in operation, it being necessary to feed to it at the proper points supplies of empty spools and long continuous strips of film, prepared backing paper and prepared sticker band material. The machine will perform the various operations necessary in the correctly timed order and deliver a completed cartridge. Other objects will appear hereinafter.

Reference will now be made to the accompanying drawings in which the same reference characters refer throughout to the same part. It is to be understood that in the drawings and particularly in those figures including diagrammatic showings, certain parts are not shown in detail nor are they drawn to scale. The machine here described is a highly complicated one and the present disclosure is intended particularly to point out and fully describe the features involving the invention as pointed out in the claims. It is to be understood that the timed relation in the actuation of the several mechanisms is obtained by such proportions and relations of mechanical parts as may be necessary for the particular materials used. For this reason such mechanisms are not shown in such detail as would merely render the drawings unnecessarily complex, but they are indicated with sufficient fullness for a skilled machine designer to design a machine and the synchronization and relation of parts is very fully stated.

Fig. 6ᴬ is a diagrammatic illustration of the threader movement;

Figures 1, 2:
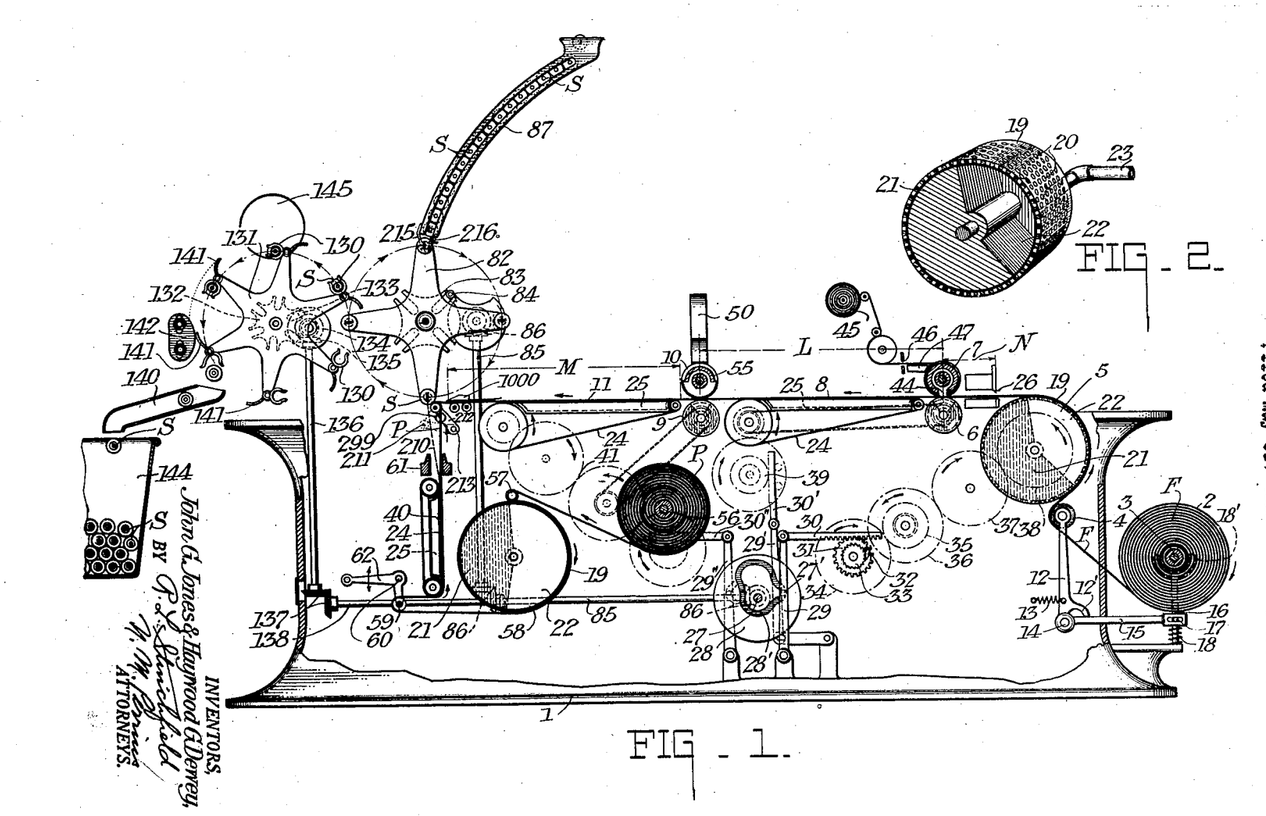
Fig. 1 is a side view partly in section of our novel machine with which our novel process may be carried out, certain parts being indicated diagrammatically.
Fig. 2 is a sectional perspective view of one of the suction rollers used on our machine.

Referring to the machine shown in Fig. 1, the base 1 supports the various moving parts upon suitable bearings, most of which are not shown, not being necessary to an understanding of the mechanism. The roll 2 of film F of suitable width, is carried by shaft 3. The film band is carried about roller 4, suction wheel 5, between the paster-applying rollers 6 and 7, across suction belt 8, between paster-applying rollers 9 and 10, across suction belt 11, into a position from which it is wound upon a spool S.

To tension and guide the film band F properly, roller 4 is carried by lever 12 pulled by a spring 13 against the film and pivoted at 14 to base 1. A second arm 15, independently pivoted at 14, engages a brake rod 16 having at 17 a pin and a slot connection therewith and pressed by spring 18 to the braking position. If the film should run too freely from reel 2, roller 4 would swing to the left (Fig. 1) and lift finger 12' from contact with arm 15, thereby permitting spring 18 to raise arm 15 and apply brake 18 to the reel. If the reverse is true, roller 4 will be drawn against spring 13 to a position in which arm 15 will release brake 18'. This mechanism governs the film feed.

The film is moved over suction drums and suction belts which retain the film in the proper path without damage to the sensitive photographic emulsion on one side or to the backing material on the other side. In Fig. 2, a typical roller is shown as consisting of a shell 19 perforated at 20 and revolving around a fixed block 21 which has a portion 22 cut away to form a vacuum chamber. A pipe 23 may exhaust the air from this chamber. The shell moves the film. It is obvious that so long as the film lying upon the perforated shell 19 is above the vacuum chamber 22 it will be retained against the shell but when the apertures move so as to lie over the block 21 the film may pass from the shell. In the drawing, dashed lines in Fig. 1 indicate those portions of the rolls which will not hold the film upon the shell. The vacuum belts 8, 11 and 40 are constructed on the same principle as the rolls, with foraminous belts 24 which, when passing over the vacuum chambers 25, hold the film, but when the film passes beyond these chambers, it is no longer held. These means provide a method for supporting and moving the film securely but with a minimum of friction, and without causing abrasion.

The film strip F passes about suction wheel 5, being measured into lengths by the intermittent movement of this wheel, and being severed by the knife 26. Wheel 5 is moved periodically from a main drive shaft 27 through a cam disk 28, pivoted lever 29, a rack 30 pivoted thereto, pinion 31, pawl and ratchet 32 and 33, and the gear train 34, 35, 36, 37 and 38. Thus cam disk 28 causes wheel 5 to turn the distance necessary to measure a film length, after which the knife 26 is actuated to cut the film. The cam disk 28 has a cam groove 28' in which a pin 27' on lever 29 engages.

This length is then drawn forward to the position shown at L, in which position the rear end of the severed strip is spaced from the knife and the unsevered end of the film by a distance N, which is sufficient for applying the pasters as will be later described.

The vacuum belt 8 is drawn forward through a cycle of movement similar to that of wheel 5, but the cycle is timed differently by another cam (not shown) mounted on drive shaft 27 and operating through a similar lever 29', rack 30', pinion and gears, not shown in detail but comprising as a whole a mechanism 39, moving the belt 8.

The second vacuum belt 11 is moved synchronously with belt 8 by a similar set of mechanism 41, indicated diagrammatically, from drive shaft 27 through lever 29" and rack 30", and the movement of belts 8 and 11 are timed to act together in a relation that will be more exactly described later. Belt 11 positions the strip of film in the space indicated by M.

From this belt the film moves into a convolution of the paper P being wound on the spool S.

Figure 8:
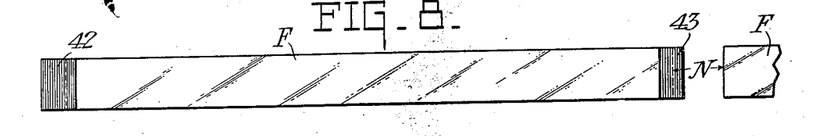
Fig. 8 shows the film band with pasters attached.

The front and back pasters, 42 and 43, (Fig. 8) are simultaneously applied in the following manner: As the film F passes between rollers 6 and 7, one portion 44 of roller 7 constitutes a vacuum member which acts on the end of the paster 43, protruding from hot plate 47. This paster is chopped off from the roll of adhesive material 45 by knife 46 and is drawn over the hot plate 47. It is drawn by suction roller 7 from the plate and is pressed into contact with the film F. This paster has adhesive of the type which is naturally tacky but becomes more so when heated. This paster-dispensing and conditioning means is fully described in our copending application Serial No. 640,261, filed May 19, 1923.

Figures 9, 10, 11, 12, 13:
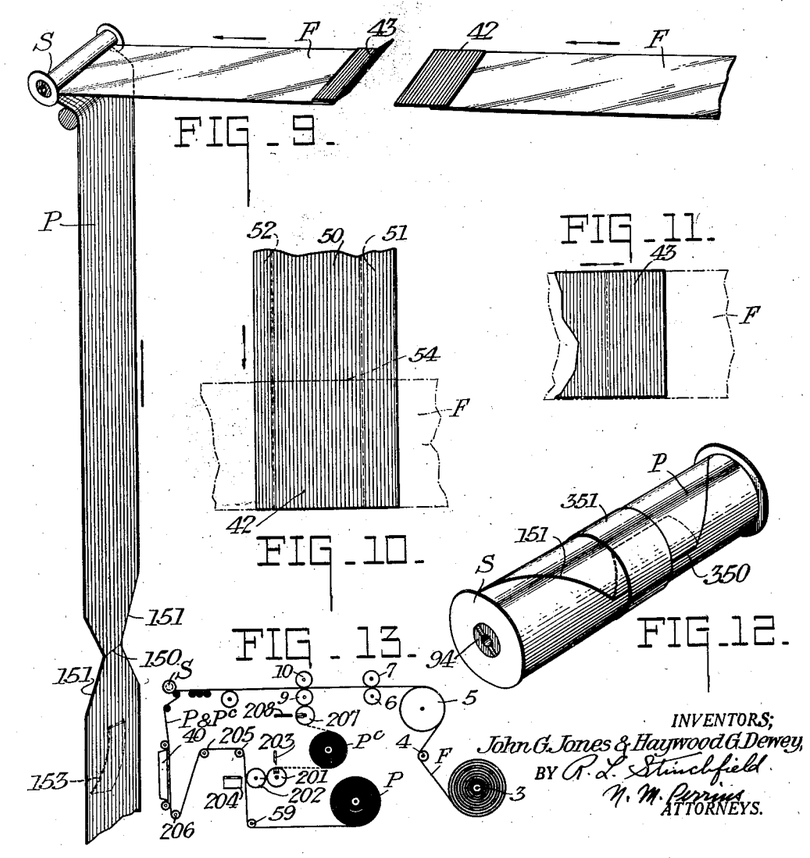
Fig. 9 shows the film spool having the convolutions of paper and film wound thereon.
Fig. 10 indicates the method of feeding one paster to the film strip.
Fig. 11 is a similar view of the other paster being applied to the film strip.
Fig. 12 is a perspective of the completed film cartridge.
Fig. 13 is a diagrammatic plan of a modified form of our invention.

Rollers 9 and 10 are at the same time applying paster 42 to the other end of the film band. This paster is preferably of the type shown in our Patent No. 1,500,393, granted July 8, 1924, and in our application Serial No. 714,747, filed May 20, 1924, and consists of a strip of material 50 having a waterless adhesive portion 51 and a water soluble adhesive portion 52 and being free from adhesive between these portions. As shown in Fig. 10, this paster is fed transversely to the film and cut on the line 54, after which the suction portion 55 of wheel 10 applies it (after being heated the waterless paster) to the film band F, the feeding and chopping arrangement being analogous to that for paster 43. The dispensing means for this sticker band is also of the type fully described in our application Serial No. 640,261. It is to be understood that these pasters are prepared at such intervals of time that one will be ready when the vacuum section of the respective rotating feed roller makes a revolution and passes the protruding end. The details of these mechanisms are sufficiently described in the application referred to. In Figs. 10 and 11 the path of travel of the film is indicated in dot-dash lines and these figures show the relation to that path of the stickers.

Moving on to the left (Fig. 9) the film, with pasters attached, is caught in a convolution of paper P and is wound upon the spool S, being directed thereto by guide 1000.

The paper P is carried in a roll at 56 from which it passes over roller 57, suction wheel 58, adjusting roll 59, suction belt 40, and finally through the threader 61. The adjusting roll 59 is carried by a bell-crank lever 62 pivoted at 60 to the frame 1, by which it may be adjusted so as to regulate the paper feed.

Figure 7:
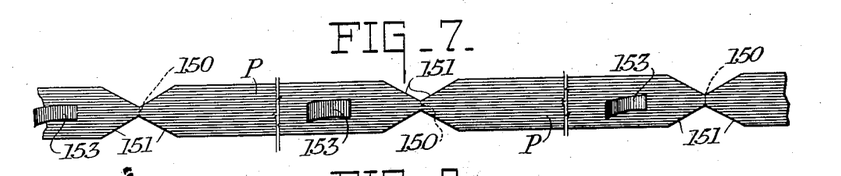
Fig. 7 is a plan view of the paper strip used with the machine.

The backing paper P is furnished in a long strip (see Fig. 7), in which are located at intervals, suitable for the film cartridge being formed, symmetrical notches with inclined walls 151, forming narrow portions at which are transverse weakened severing lines 150. These form the tapered end portions of the paper strips for the individual spools of film. At intervals along the strip P, and properly positioned with respect to the lines 150 are pasters 153 which are eventually wound into the convolutions of the paper near the core of the spool. When rewound in a camera upon another spool the paper can be secured by these pasters which then will be positioned at the outer convolution. It is to be understood that the paper as shown in Fig. 7 is fed toward the right. Fig. 9 shows the relation of this sticker in being fed.

Figures 3, 5, 6, 6A:
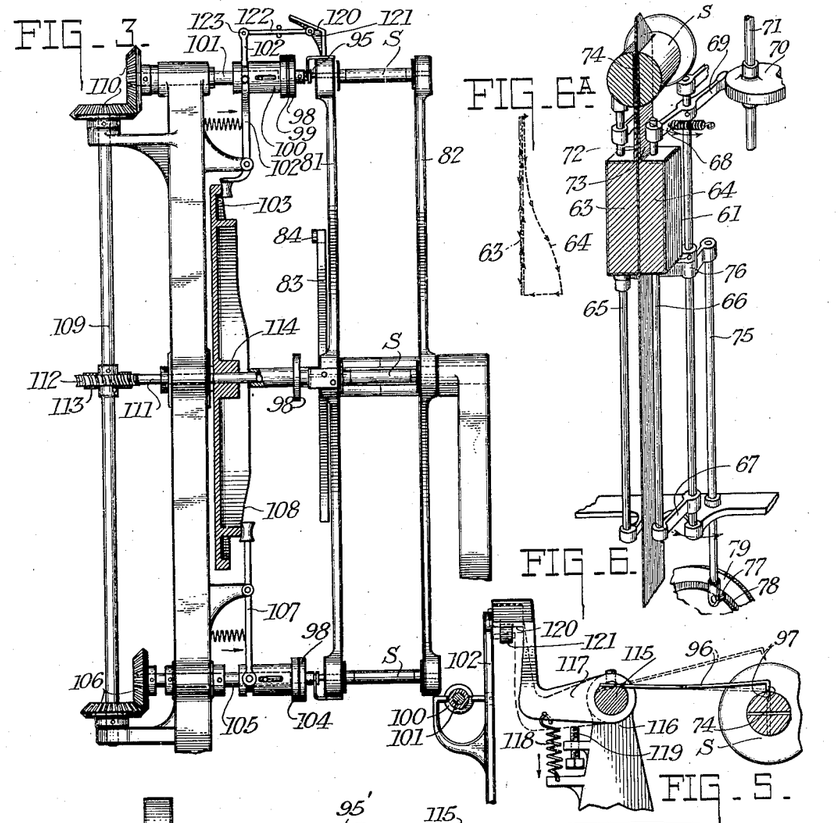
Fig. 3 is a side elevation, part being in section, of certain portions of the machine.
Fig. 5 is an enlarged view of the slot-locating mechanism.
Fig. 6 is a perspective view, partly in section, of portions of the paper-threading mechanism.

The threader 61 may consist of the structure shown in Fig. 6, where the blocks 63 and 64 slide freely upon rods 65 and 66. Rod 66 is movable, swinging upon arms 67 and 68, the latter having an arm 69 contracting with the cam 70 carried by rotating shaft 71 so that the rod 66 will be periodically swung from the position shown in this figure along the line of the arrows.

Each block has upwardly extending blades 72 and 73 which may enter the slot 74 of a spool S and carry the end of the paper therethrough. The blocks are given an up-and-down movement upon rods 65 and 66 by a rod 75 terminating in a head 76 contacting with a portion of the bottoms of blocks 63 and 64 and actuated by roller 77 which moves in cam slot 78 in a rotating disk 79. The movement given blades 72 and 73 by cams 70 and 78 is such that at the lower extremity of movement they come together and grasp the paper, then carry the paper upwardly through the spool slot 74, then they separate sufficiently to release the paper, withdraw from the slot and gradually open into the position shown diagrammatically in Fig. 1. This movement is also indicated diagrammatically in Fig. 6A. It will be noted that in the form shown block 63 merely reciprocates in a straight line, and the sideways movement is accomplished entirely through block 64. The first side movement of block 64 need only be a few thousandths of an inch in practice to release the paper, but after the blades are withdrawn from the slot it is preferable to open the blades a considerable distance as shown.

The spool must be presented with the wide edge 80 of the slot 74 toward the paper feed. This is done as follows: A rotary head consists of frames 81 and 82 (Fig. 3) facing each other and periodically moved by the Geneva gear 83 and pin 84, the latter being moved through shafts 85 and gears 86 from the power shaft 27.

The paper, when first inserted into the spool slot, lies along the dotted line 210 (Fig. 1). A roller 211 is carried on an arm 212 pivoted at 213 to the main frame. When the paper is threaded this arm and roll lie in an inoperative position indicated in dotted line, but as soon as winding of the paper on the spool begins, this arm and roller swing to the full line position shown. The paper assumes the full line position and with the cartridge readily engages the end of the film as it is fed forwardly by belt 11, past guide 1000.

Spools S are fed down chute 87 to the dispensing spring fingers 215 and 216. These are so shaped and positioned that they will hold one spool at a time in such a position that it will be engaged by the mechanism now to be described. They hold them with only enough firmness to position them. Such feeding or dispensing arrangements are well known.

Figure 4:
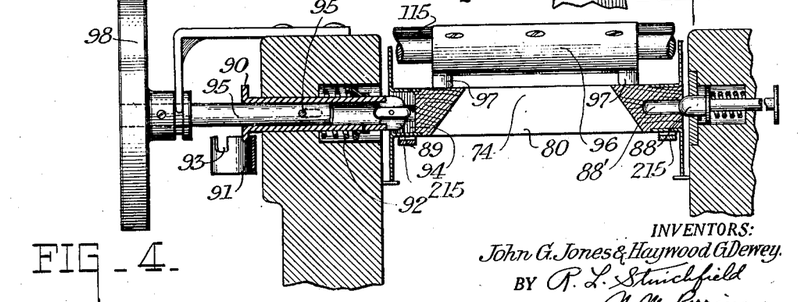
Fig. 4 is an enlarged sectional detail of a spool holder.

The spool so held is engaged at one end by the spring-pressed centering pin 88 which is cylindrical and has a rounded head that slips into the round aperture 88' in the spool, and at the other end, which has a slot 94, by the spring-pressed winding web 89. This web is automatically withdrawn when the flange 90 of the web member contacts with cam 91, drawing back the web against the spring 92. When flange 90 is released by notch 93 in cam 91, the web 89 may be out of alignment with spool end slot 94, but this is not material because when shaft 95, with which the web has a pin and slot connection 95', is rotated (as will be hereinafter described) the web will either rotate until it drops into the slot, should the spool S remain stationary, or should the spool be rotated by frictional contact the spool will turn until spring 96 forces fingers 97 into the wide edge 80 of slot 74. This locates the spool slot and stops the spool in the desired position, and web 89, if unengaged, continues to rotate until it engages the slot 94.

To rotate shaft 95 the following mechanism is used. On shaft 95 is a clutch member 98. A friction block 99 is carried by the slide block 100 movable along shaft 101 by the lever 102. Lever 102 is actuated by cam 103 timed to rotate shaft 95 the few necessary revolutions when the rotating head is stationary in the position shown in Fig. 3. The block 99 is then moved from contact with clutch 98, which is, of course, carried around with the rotary frames 81, 82. When at the winding position, clutch member 98 is contacted by another clutch member 104, driven by shaft 105 and bevel gears 106, and actuated by lever 107 controlled by cam 108, to drive the spool to wind the film and paper thereon. This is timed to operate immediately after the withdrawal of blades 72, 73 from slot 74. Shaft 109 actuates shaft 101 through gears 110, and shaft 111 through a gear 112 and worm 113, shaft 111 carrying the cam wheel 114 with the above mentioned cams 103 and 108.

The spool-locating fingers 97 carried by spring 96 are actuated in the following manner: Spring 96 is carried on shaft 115 (Fig. 5) which is mounted in suitable bearings 116. A lever 117 is pinned to this shaft, and is normally drawn by a spring 118 against a locating screw 119 holding spring 96 as shown in dashed lines. Lever 117 terminates in a cam 120 which is in the path of a roller 121 carried by link 122 (Fig. 3) pivoted at 123 to lever 102 which, as before explained is moved by cam 103. Thus when the lever is moved to rotate the spool, roller 121 raises lever 117 moving shaft 115 to bring spring 96 into the position shown in full lines, Fig. 5, and, when the spool is turned until the wide edge 80 of the slot registers with the fingers 97, these will be pressed into the slot—dot and dash lines Fig. 5—and properly locate the spool. The fingers will be retained in this position until the spool-driving shaft is no longer rotated by the main driving shaft 101 so that there is no chance of changing the location of the slot after the proper position is once determined. After the fingers 97 engage the slot 74, the spool will be fixed in position and the friction clutch members 98 and 99 will slip. This will be for only a very few revolutions of member 99.

The rear end of the paper is given a fold by the automatic mechanism indicated at 299 (Fig. 1) and shown in detail in Figs. 14 to 18 inclusive. This folder also severs the paper along the weakened line 150. When the paper band P is stationary, the folding arm 300, and the guide arm 301 having an outwardly flared end 303, are moved to the position shown in Fig. 14 in which the paper band P lies between them. Both arms are carried by ring 302 affixed to gear 312, these members being mounted to revolve freely on shaft 304, being held thereon by the nut 325 and washer 326. Gear 312 meshes with gear 313 affixed to shaft 314 passing through a bearing 315 and also carrying a second gear 316, driven by gear 317 intermittently by a Geneva movement not shown.

Figure 16:
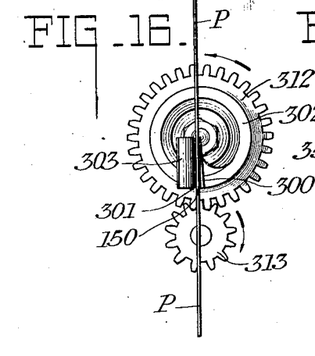
Fig. 16 is an end elevation of certain parts shown in Fig. 14.

Shaft 304 does not turn in bearing 330 but carries a key 304' which engages slot 320 so that the shaft slides without turning. A spring 311 normally holds roller 307 carried by yoke 306 against cam 308, which is keyed at 310 to a shaft 309 driven in synchronism with the other parts of the machine. Cam 308 moves shaft 304 to the position shown in Fig. 14 when the paper band is motionless, at which time gear 313 causes gear 312 to revolve half a turn, severing the paper strip P along the weakened line 150, and folding it at 350 as shown in Figs. 16, 17 and 18.

Figure 14:
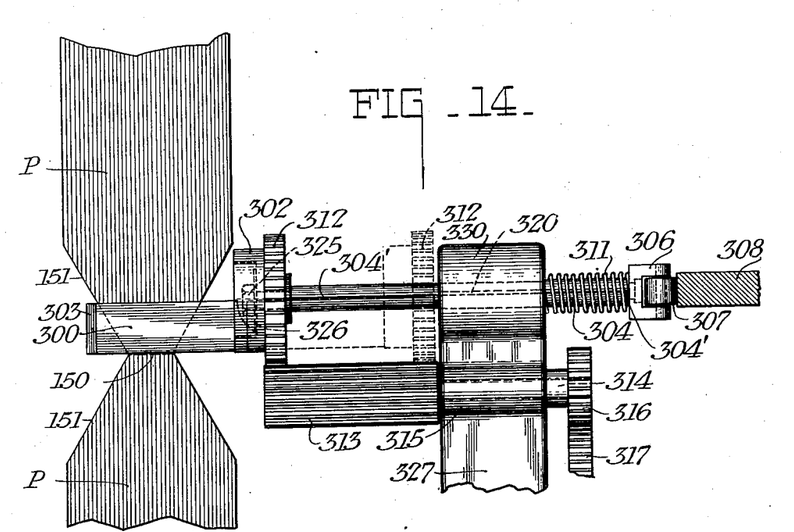
Fig. 14 is a detail side elevation of the paper folding and severing device.
Figure 15:
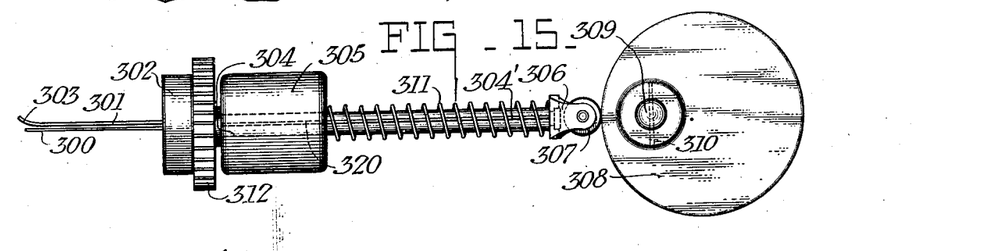
Fig. 15 is a fragmentary plan view of the parts shown in Fig. 14.
Figures 17, 18:
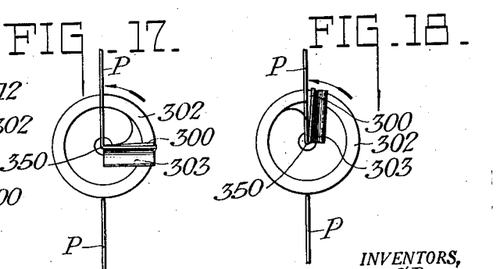
Figs. 17 and 18 diagrammatically illustrate steps in the paper-folding process.

When folded as shown in Fig. 18, the cam 308 permits the arms 300 and 301 to be withdrawn or retracted into the position shown in dashed lines Fig. 14, in which position the parts will remain stationary while the convolutions of film and paper are wound on the spool.

As is shown in Fig. 12, the fold 350 just described is on the outer end of the backing paper and greatly facilitates opening the spooled film for use in loading a camera, as it furnishes a shoulder against which seal 351 may be broken.

After winding the convolutions of paper and film on spool S, the rotating frames 81, 82 carry the spool to a position in which a spring clasp 130 grasps the spool S. The winding web 89 is first withdrawn from the end of the spool by a suitable cam, not shown, but similar to 91, above described. A series of clasps 130 are carried by turret 131, which is moved step by step by Geneva gear 132, pin 133 and suitable gears 134, 135, shaft 136, gears 137, shaft 138 which is connected to, or is preferably an extension of a shaft 85 driven by the power shaft 27. Turret 131 moves in timed relation with the carriers 81, 82 and after sealing pasters 351 are applied by mechanism indicated at 145, but not shown in detail, it drops the spools into a chute 140, when arm 141 of the clasps contacts with cam 142. This chute delivers the spools into a suitable receptacle 144. As the mechanism outlined herein and designated by reference characters 130 to 145 form the subject matter of our other copending application, Serial No. 640,262, filed May 19, 1923, the details will not be more fully described herein.

Since the length of the paper and film wound on the spool is accurately predetermined, the outer end of the paper will lie at a known relation and the cartridge is so grasped and held by clasps 130 that the sealing paster will be applied over this end.

We also contemplate introducing sheets of carbon paper in assembling cartridges adapted to have inscriptions written on the film in the camera in a well known manner. In Fig. 13 is indicated diagrammatically the assembly permitting such an operation, the film F and paper P passing through substantially the same path as in Fig. 1. A roll of carbon paper Pc is introduced. In addition to paster-applying station 10 in the path of the film, a similar paster-applying station 204 is situated in the path of the paper; and a feed roll 202 similar to feed roll 9 is used. Additional feed rolls 207 and 201 cooperate with 9 and 202 respectively and with these cooperate chopping knives 208 and 203 respectively. This arrangement permits the introduction of carbon paper by either of two paths as indicated by dotted lines. In one case the carbon paper is fed in lengths, determined by the timed operation of rollers 201, 202 and knife 203, to the paper P to which it is attached by a sticker applied at 204. In the other case it is fed in lengths determined by the timed operation of roller 207 and knife 208, to the film F to which it is attached by the sticker already described as attached at 10. In either case it is assembled in the cartridge in the winding as heretofore described.

The mechanism connecting the central power shaft and each of the above described intermittently operating parts are not shown with any fullness as their details are of no importance and a complete exact drawing would conceal rather than disclose the invention. It is to be understood, however, that mechanisms analogous to those indicated for the actuation of drum 5, belt 8 and the like, serve to operate the several parts at the proper time, and that the laying out of the details of the cams and the proportioning of the parts, while important, can be done by a skilled designer. Their cooperation may be much more readily understood from a chart showing their timed relation than from a drawing showing the mechanism itself; and this method of description will, therefore, be employed.

It is to be understood that three strips of film are simultaneously being fed through the apparatus. While the first is being fed from belt 11 to the cartridge, the second is being fed from belt 8 to belt 11, and the third from drum 5 under the knife to belt 8 to be severed. At each cycle the frame 82 is advanced a quarter turn, the spool that is grasped and centered at the upper or first position, being idle during the second cycle and wound with film and paper during the third cycle. At the fourth cycle the wound cartridge is moved to the left and grasped by a clamp 130 on the spider 131. This spider moves a sixth revolution at each cycle, and applies the sealing strip 351 in the manner described in our above mentioned application, Serial No. 640,262, and drops it into receptacle 144.

Figure 19:
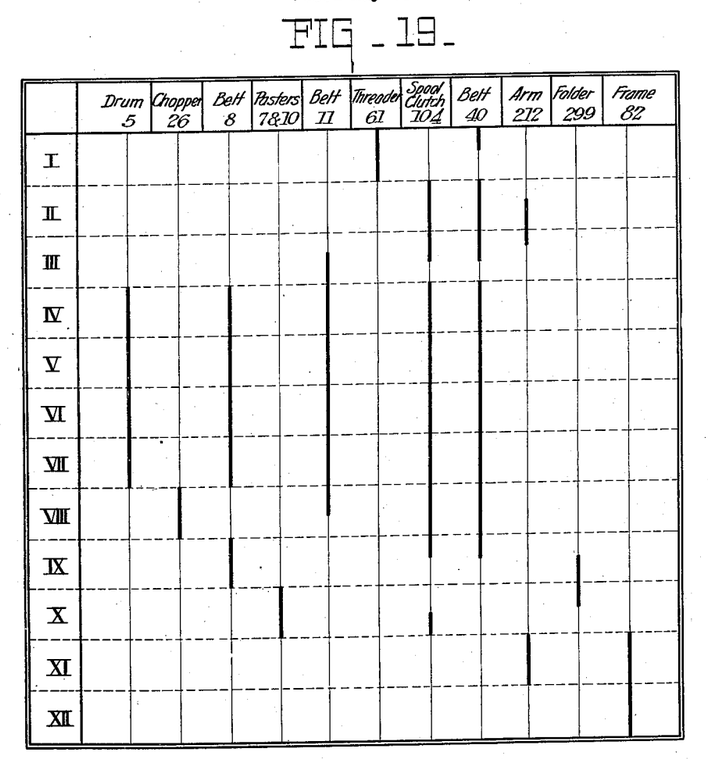
Fig. 19 is a chart showing the timed relation of the movement of the several parts.

Referring now to Fig. 19, the synchronism and sequence of operations will be reviewed and certain details of movement will be more exactly described. In this figure, the dashed cross lines indicate twelve intervals of time. The light and heavy portions of the vertical lines indicate that the part referred to at its top is respectively motionless or in operation during the corresponding time intervals. This figure shows the time relation of the parts operative to wind the film and paper. Hence to follow a single strip of film through, it will be necessary for three cycles to elapse. While the intervals of time are here indicated as equal in length it is to be understood that this is by no means usual, and is so shown merely for convenience, and that the relative length of the various intervals must necessarily be adjusted to suit the requirements of the work. We have chosen as the beginning of the cycle the instant when the frame 82 has come to rest. The lead end of the film passing over drum 5 is opposite knife 26. The next strip is lying on belt 8 in the position indicated by L and the third on the belt 11 in the position indicated by M. The film F remains still until the cycle is about a quarter through, then drum 5 turns, moving the film under chopper 26 to belt 8, which meanwhile is moving. When a length of film of the predetermined length has passed under knife 26, which is indicated as occupying four intervals of time (IV to VII), both belt 8 and drum 5 stop and the knife 26 is at once operated (Interval VIII) to sever the length of film. Belt 8 then (Interval IX) moves the film to the position indicated at L and the two band applying rolls 7 and 10 operate simultaneously (Interval X) applying sticker bands to both ends of the film strip. The film remains thus until the band 8 begins to move in the next cycle at the same time that drum 5 begins to advance the succeeding strip of film. Belt 8 moves the film with stickers attached to belt 11 which is also moving at this time and the film is drawn over upon this belt which continues to move (Interval VIII) for a very short distance after belt 8 has stopped and draws the rear end of the film past the sticker-applying station at 7 to a position indicated at M. The front of the film on belt 11 is now under guide 1000 and slightly spaced from the spool-wrapping station. This separation of the films prevents interference between a sticker 43 already applied to the rear end of the film on belt 11 and a sticker 42 being applied to the lead end of the film on belt 8.

The films remain in the described positions until this second cycle is completed. Just before the completion of the cycle (Interval XI), arm 212 swings down to the dotted line position to give the threader 61 room to operate and at the same time (Intervals XI and XII) the frame 82 moves a new spool S into loading position. As soon as this cycle is completed threader 61 grasps the lead end of the paper P and inserts it in the slot of the spool, the belt 40 moving slightly at the same time. As soon as the jaws are retracted, clutch 104 is rendered operative to turn the spool and wind the paper thereon, belt 40 also moving the paper, (Intervals II and III) and arm 212 swinging back to full line position. Enough paper is wound on the spool to constitute the required lead strip for the film and then belt 40 and the spool stop momentarily. During the latter part of Interval II, belt 11 has begun to move and the lead end of the film with paster 42 is forced into the outer convolution of paper being wound on the spool. The belt 40 and clutch 104 again operate and the paper and film are wound together on the cartridge, belt 11 feeding the rear end of the film forwardly. After the strip of film is wound, the belt 11 continues to move only until the lead end of the next strip is properly positioned at M; but clutch 104 and belt 40 continue to move the paper until the rear lead strip is nearly wound. They then stop (Interval IX) and the folder 299 is operated, after which clutch 104 operates (Interval X) to give the spool enough turns to complete the winding of the paper and to position the rear end properly for the later application of a sealing band. The cycle is then completed by the movement of the wound cartridge to the position to be grasped by clasp 130.

The rear sticker 43 being covered with a permanently adhesive material, part of which extends beyond the film, is pressed by the tight winding into adhesive contact with the protective paper, but the sticker 42 having only a dry adhesive in exposed position does not adhere to the paper.

In Fig. 1, the path of the film is shown as an unbroken line but it is to be understood that the film itself is in a number of strips with spaces between as fully described. Fig. 9 shows the relation of the paper and two strips of film in the middle of the winding operation.

In previous methods of assembling roll film cartridges, it has been customary to wind a lead strip portion of protective material on a spool, then stop the spool while a sticker is attached to one end of a film strip, then wind the film and paper, then stop the machine while the rear sticker is attached, and then complete the winding. By the process herein described the film is prepared as a unit before being brought to the winding station, and it is necessary to stop the winding of the protective paper, if at all, only long enough to insure of the lead end of the film with its sticker being properly positioned. This process is, of course, applicable to winding by hand or on other machines, and is of advantage in that the winding process is more expeditiously carried out and can be done with a machine having a higher rotative speed.

It is to be understood that the disclosure herein is illustrative and that we contemplate as within the spirit of our invention all such embodiments, improvements and equivalents as fall within the scope of the appended claims.

Having thus described our invention, what we claim as new and desire to secure by Letters Patent is:

1. The process of assembling a roll film cartridge that comprises the attachment of sticker bands to opposite ends of a strip of film and the interwinding of such prepared strip with a strip of protective material.

2. The process of assembling a roll film cartridge that comprises the attachment of sticker bands to opposite ends of a strip of film, the tabs extending beyond the ends of the film, and one being permanently sticky and one being hard when dry, and then interwinding said strip with a strip of protective material.

3. A machine for automatically assembling roll film cartridges and comprising means for automatically positioning a spool with a slotted core in a definite predetermined relation at a station, means for engaging the end of a strip of material in a slot of a spool so positioned and means for turning the spool and winding the material thereon.

4. A machine for automatically assembling roll film cartridges and comprising means automatically operative to position a spool with strip-engaging means in a definite predetermined relation at a station.

means then automatically operative to engage the end of a strip of material with said strip-engaging means and means then automatically operative to turn the spool and wind the material thereon.

5. In a machine for automatically assembling roll film cartridges, means for positioning a spool, means for automatically engaging the end of a strip of paper with such spool, means then automatically actuated for turning said spool to wind the paper thereon, means automatically operative during such winding to feed thereto a strip of film to be interwound with said paper.

6. In a machine for automatically assembling roll film cartridges, means for positioning a spool, means for automatically engaging the end of a strip of protective material with such spool, means then automatically operative for turning said spool to wind the material thereon, means automatically operative at a definite predetermined time during such winding to feed thereto a strip of film to be interwound with the protective material.

7. A machine for assembling roll film cartridges comprising means for supplying a continuous strip of film, means for cutting said strip in predetermined lengths, means for feeding a continuous strip of paper, means for engaging said paper strip with a spool, means for turning said spool and winding the paper thereon, means adapted to feed a length of film into the convolutions of paper during winding thereof on the spool.

8. A machine for assembling roll film cartridges comprising means for supplying a continuous strip of film, means for cutting said strip in predetermined lengths, means for feeding a continuous strip of paper, means for engaging said paper strip with a spool, means for turning said spool and winding the paper thereon, means adapted to feed a length of film into the convolutions of paper during winding thereof on the spool and mechanisms for controlling the automatic operation of each of said means in timed relation one to the other.

9. A machine for automatically assembling roll film cartridges and comprising means for positioning a spool, means for automatically engaging the end of a strip of paper with such spool, means then automatically actuated for turning said spool to wind the paper thereon, means automatically operative when the spool has made a predetermined number of turns to feed thereto a strip of film, said turning means thereafter operating automatically a predetermined amount to complete the winding of predetermined lengths of film and paper thereon.

10. A machine for automatically assembling roll film cartridges and comprising means for positioning a spool, means for automatically engaging the end of a strip of paper with such spool, means then automatically actuated for turning said spool to wind the paper thereon, means automatically operative when the spool has made a predetermined number of turns to feed thereto a strip of film, said turning means thereafter operating automatically a predetermined amount to complete the winding of predetermined lengths of film and paper thereon and means then automatically operative for applying a sealing band to the rolled cartridge.

11. In a machine for assembling roll film cartridges, means for carrying individual spools having strip-engaging means to a station, means to position the spools whereby the strip-engaging means will have a definite predetermined relation to the station, means for feeding strip material into operative engagement with the strip engaging means and means for turning said spool to wind the strip material thereon.

12. In a machine for assembling roll film cartridges, means for carrying individual spools having slotted cores to a station, means to position the spools whereby the slots will have a definite, predetermined relation to the station, means feeding the end of a strip of material into a slot of a spool so positioned, and means for turning said spool to wind the strip material thereon.

13. In a machine for assembling roll film cartridges, a spool delivery station, a carrier having a path of movement past said station, means on the carrier for rotatably engaging one end of a spool at said station, means on the carrier automatically operative to engage the other end of such a spool positively and means for applying a turning force to said spool through said second means.

14. In a machine for assembling roll film cartridges, a spool delivery station, a carrier having a path of movement past said station, means on the carrier for rotatably engaging one end of a spool at said station, means on the carrier automatically operative to engage the other end of such a spool positively, means for feeding the end of a strip of material to said spool and means for applying a turning force to said spool through said second means to wind a strip of material thereon.

15. In a machine for assembling roll film cartridges, a spool delivery station, a carrier having a path of movement past said station, a movable web on the carrier adapted to engage a slot in the end of a spool and means on the carrier adapted to engage the other end of the spool, operating means automatically operatve to move the web into driving engagement with the slot, and means for turning the web to rotate the spool.

16. In a machine for assembling roll film cartridges, a spool delivery station, a rotatable carrier having a path of movement past said station, a longitudinally movable web on the carrier, automatic means including a cam adapted to control the longitudinal movement of the web whereby it may be moved into engagement with a slot on the end of a spool at the delivery station, means on the carrier for engaging the other end of the spool, and means for turning the web to rotate the spool.

17. In a machine for assembling roll film cartridges, means for feeding individual spools to a station, a carrier having a path of movement past said station and past a second station, means on the carrier adapted to remove individual spools from said first station, means adapted to attach the end of a strip of material to said spool at said second station, and means adapted to turn said spool and wind said strip material thereon.

18. In a machine for automatically assembling roll film cartridges, means for feeding slotted spools to a station, a carrier having a path of movement past said station and past a second station, means on the carrier adapted to remove individual spools from said first station, means adapted to adjust said individual spools with respect to the carrier, whereby they will be given a definite predetermined position at said second station, means to feed the end of a strip of material into a slot in the spool at said second station and means to turn said spool and wind the material thereon.

19. In a machine for assembling roll film cartridges, means for feeding individual spools with strip engaging means to a station, means to engage a spool at said station, and means to position said spool with the strip-engaging means thereof in a definite predetermined relation.

20. In a machine for assembling roll film cartridges, means for feeding individual spools with slotted cores to a station, means to engage a spool at said station and means to position said spool with the slot thereof in a definite pretermined relation.

21. In a machine for assembling roll film cartridges, means for feeding individual spools with slotted cores to a station, means to engage a spool at said station, a movable blade having a definite position and adapted to engage a slot of a spool and thereby position the spool in a definite predetermined relation.

22. In a machine for assembling roll film cartridges, means for positioning a spool with a slotted core in a definite predetermined relation at a station, jaws adapted to clamp the end portion of a strip of material and advance it into the slot of such a spool, and means to turn the spool to wind the material thereon.

23. In a machine for assembling roll film cartridges, means positioning a spool with a slotted core in a definite predetermined relation at a station, flat blades adapted to clamp the opposite surfaces of the end portion of a strip of material, means adapted to advance the blades in clamping engagement with the material into the slot of such a spool and then to release such blades from clamping engagement and to remove them from advanced position, and means to turn the spool to wind the material thereon.

24. In a machine for assembling roll film cartridges, means for supporting and turning a spool and thereby winding a strip of material thereon, mechanism in proximity thereto for engaging the outer end of such a strip and folding it.

25. In a machine for assembling roll film cartridges, means for supporting and turning a spool and thereby winding a strip of material thereon and means for engaging such strip, severing it and folding the severed end.

26. In a machine for assembling roll film cartridges, means for supporting and turning a spool and thereby winding a strip of material thereon, means for supplying a continuous strip of material to such spool, means for engaging said continuous strip, severing it and folding the severed end.

27. In a machine for assembling roll film cartridges, means for supporting and turning a spool, thereby winding a strip of material thereon, means for supplying a continuous strip of material thereto, two fingers adapted to engage opposite sides of the strip of material, means to rotate said fingers and thereby sever said paper and fold the severed end.

28. In a machine for assembling roll film cartridges, means for supporting and turning a spool, thereby winding a strip of material thereon, automatic mechanism operative to stop the turning of the spool after a predetermined interval and automatic means then operative to fold the material.

29. In a machine for assembling roll film cartridges, means for supporting and turning a spool, thereby winding a strip of material thereon, means for supplying a continuous strip of material thereto, fingers adapted to engage the opposite sides of said material, means automatically operative to stop the turning after a predetermined interval, and means automatically operative to move said fingers into operative engagement with the material, and then to rotate them, thereby severing the paper and folding the severed ends.

30. In a machine for assembling roll film cartridges, mechanism for supporting and turning a spool, thereby winding a strip of material thereon, means automatically operative to stop the winding of the material after a predetermined interval. means then automatically operative to fold the outer end of said strip of material, said first named means then being again operative to complete the winding of the material and stop the winding with the folded end in a predetermined relative position.

31. In a machine for assembling roll film cartridges, mechanism for supporting and turning a spool, thereby winding a strip of material thereon, means automatically operative to stop the winding of the material after a predetermined interval, means then automatically operative to fold the outer end of said strip of material, said first named means then being again operative to complete the winding of the material and stop the winding with the folded end in a predetermined relative position, and means then automatically operative to apply a sealing band across said folded end.

32. A machine for automatically assembling roll film cartridges and comprising a source of film in the form of a continuous strip, a source of paper in the form of a continuous strip, means for feeding the film strip a predetermined distance, means for cutting off a strip of predetermined length so fed, means for feeding the paper strip, means for bringing a slotted spool to a predetermined position, means for directing the lead end of the paper strip into the slot of the spool in such position, means for turning the spool and thus winding the paper strip thereon, means for feeding the severed film strip to the partly wound paper strip when it has been turned a predetermined amount whereby it may be interwound with the paper, and intermittently operated mechanisms operating in timed relation one to the other and respectively controlling the actuations of each of the above means whereby they will severally operate automatically at the appropriate predetermined time, and power means driving all of said means and mechanisms.

33. A machine for automatically assembling roll film cartridges and comprising a source of film in the form of a continuous strip, a source of paper in the form of a continuous strip, means for severing the film into strips of definite predetermined length, means for attaching stickers to the ends of each strip, means for positioning a spool at a station, means for feeding the end of the paper strip to the spool, means for turning the spool and winding the paper thereon, means for feeding an individual strip of film into a partly wound spool of paper, mechanisms for controlling the actuation of each of the above means in timed relation and power means driving all of said means and mechanisms, whereby each will operate automatically at the appropriate, predetermined time.

Signed at Rochester, New York, this 24th day of May, 1923.

JOHN G. JONES.
HAYWOOD G. DEWEY.